United States Patent
Yoo et al.

(10) Patent No.: US 7,068,472 B2
(45) Date of Patent: Jun. 27, 2006

(54) HARD DISK DRIVE ACTUATOR LATCH UTILIZING A FLUID CHANNEL TO DELIVER TORQUE TO A LATCH LEVER

(75) Inventors: Yong-chul Yoo, Suwon-si (KR); Sang-chul Ko, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 177 days.

(21) Appl. No.: 10/410,189

(22) Filed: Apr. 10, 2003

(65) Prior Publication Data
US 2003/0193754 A1    Oct. 16, 2003

(30) Foreign Application Priority Data
Apr. 11, 2002    (KR) ............................... 2002-19723

(51) Int. Cl.
G11B 5/54        (2006.01)
(52) U.S. Cl. .................................. 360/256.1; 360/256
(58) Field of Classification Search ............. 360/256.1, 360/256
See application file for complete search history.

(56) References Cited

U.S. PATENT DOCUMENTS

| | | | |
|---|---|---|---|
| 4,647,997 A | | 3/1987 | Westwood ............... 360/256.1 |
| 5,541,791 A | * | 7/1996 | Yamasaki et al. ........ 360/256.1 |
| 5,555,146 A | | 9/1996 | Hickox et al. ........... 360/256.4 |
| 5,602,700 A | | 2/1997 | Viskochil et al. ........ 360/256.1 |
| 5,668,683 A | | 9/1997 | Stone ....................... 360/256.1 |
| 5,715,118 A | | 2/1998 | Tacklind ................... 360/256.1 |
| 5,717,544 A | | 2/1998 | Michael .................... 360/256.1 |
| 5,768,057 A | | 6/1998 | Fernandes et al. ........ 360/256.1 |
| 5,859,751 A | | 1/1999 | Tacklind ................... 360/256.1 |
| 6,031,690 A | * | 2/2000 | Kelemen et al. .......... 360/256.1 |
| 6,163,433 A | * | 12/2000 | Misso ....................... 360/256.1 |
| 6,185,074 B1 | | 2/2001 | Wang et al. .............. 360/256.4 |
| 6,337,782 B1 | * | 1/2002 | Guerin et al. ............. 360/256.1 |
| 6,342,991 B1 | * | 1/2002 | Joshi et al. ............... 360/256.1 |
| 6,362,937 B1 | * | 3/2002 | Gibbs et al. .............. 360/256.1 |
| 6,535,357 B1 | | 3/2003 | Misso et al. .............. 360/256.2 |

(Continued)

FOREIGN PATENT DOCUMENTS

CN         1174624 A        2/1998

(Continued)

OTHER PUBLICATIONS

Office Action dated Oct. 29, 2004 of corresponding Chinese Patent Application No. 03108682.9.

(Continued)

*Primary Examiner*—Jefferson Evans
(74) *Attorney, Agent, or Firm*—Staas & Halsey LLP

(57) ABSTRACT

An actuator latch apparatus of a hard disk drive for locking a pivoting actuator includes a locking protrusion provided at one side of the actuator, a latch lever pivotably installed on the base and elastically biased such that a hook portion provided at one side of the latch lever restricts the locking protrusion, and an air flow pipe provided at the base and generating a driving torque to the latch lever by a pressure differential between the atmosphere and air flowing along a channel formed in the air flow pipe. Thus, since locking and unlocking are performed by selectively restricting the locking protrusion provided at the actuator, unlocking can be smoothly performed without any impacts while a locking state is maintained firmly. Also, since locking and unlocking of the actuator is driven by elastic bias and the rotation of the hard disk, power consumption is reduced.

18 Claims, 4 Drawing Sheets

U.S. PATENT DOCUMENTS

| | | | |
|---|---|---|---|
| 6,704,168 B1 * | 3/2004 | Michael et al. | 360/256.1 |
| 6,724,577 B1 * | 4/2004 | Ishii et al. | 360/256.1 |
| 6,728,074 B1 * | 4/2004 | Hanada et al. | 360/256.1 |
| 2003/0210500 A1 * | 11/2003 | Hong et al. | 360/256.1 |

FOREIGN PATENT DOCUMENTS

| | | |
|---|---|---|
| EP | 0 450 184 | 10/1991 |
| JP | 04-228158 | 8/1992 |
| JP | 04-341982 | 11/1992 |
| WO | 00/51126 | 8/2000 |

OTHER PUBLICATIONS

Japanese Office Action issued Dec. 28, 2005.

* cited by examiner

HARD DISK DRIVE ACTUATOR LATCH UTILIZING A FLUID CHANNEL TO DELIVER TORQUE TO A LATCH LEVER

CROSS-REFERENCE TO RELATED APPLICATIONS

This application claims the benefit of Korean Application No. 2002-19723, filed Apr. 11, 2002, in the Korean Industrial Property Office, the disclosure of which is incorporated herein by reference.

BACKGROUND OF THE INVENTION

1. Field of the Invention

The present invention relates to an actuator latch apparatus of a hard disk drive for locking or unlocking an actuator of a hard disk drive.

2. Description of the Related Art

In general, a hard disk drive, as shown in FIG. 1, includes a hard disk 20 rotatably installed on a base 10 and on and from which predetermined information is recorded and reproduced. A hard disk also includes a magnetic head transfer apparatus for transferring a magnetic head 50 to a desired track position on the hard disk 20 to record and reproduce information. Here, the hard disk 20 is divided into a record area 22, where information is recorded, and a parking area 21 provided at the inner side of the hard disk 20, where the magnetic head 50 is disposed when the hard disk 20 stops rotating. The magnetic head transfer apparatus includes an actuator 30, where the magnetic head 50 is installed, capable of pivoting around a pivot shaft 34 provided on the base 10, a voice coil motor (not shown) for pivoting the actuator 30 by an electromagnetic force, and a latch apparatus for locking the actuator 30 after the magnetic head 50 is disposed in the parking area 21.

The actuator 30 includes a suspension portion 31 supporting the magnetic head 50, an arm 32 coupled to the pivot shaft 34 and capable of pivoting, and a bobbin portion 33. The voice coil motor, which will be described later, includes a moving coil 35 wound around the bobbin portion 33 and a magnet 41 attached to a yoke 40 installed at the base 10 to generate magnetic force.

Although not shown in the drawing, there are a pair of yokes 40 facing each other with the actuator 30 interposed therebetween. An electromagnetic force is generated by an interaction between the lines of a magnetic force generated by the magnet 41 and current flowing on the moving coil 35 so that the actuator 30 pivots in a direction according to Fleming's left hand rule.

The latch apparatus that locks the actuator 30 after the magnetic head 50 is disposed in the parking area 21 includes a magnetic member 43, installed at the yoke 40 and magnetized by the magnet 41, a damper 60 inserted in a coupling protrusion 36 provided at an end portion of the bobbin portion 33 of the actuator 30, and a steel piece 61 coupled to an end portion of the damper 60.

Accordingly, when the actuator 30 pivots and the magnetic head 50 installed at the suspension portion 31 enters the parking area 21 of the hard disk 20, as shown in FIG. 1, the steel piece 61 coupled to the side of the bobbin portion 33 adheres to the magnetic member 43. Thus, the actuator 30 maintains a state of being locked by a magnetic coupling between the steel piece 61 and the magnetic member 43 until an electromagnetic force for pivoting the actuator 30 is generated again.

The reason for locking the actuator 30 as described above is shown below. First, the suspension portion 31 supporting the magnetic head 50 provides an elastic force in a direction that keeps the magnetic head 50 in close contact with the surface of the hard disk 20. Thus, the magnetic head 50 maintains a state of closely contacting the surface of the hard disk 20 unless an external force is applied. However, when the hard disk 20 starts to rotate, air flow is generated around the magnetic head 50 by the rotation of the hard disk 20. The air flow generates aerodynamic lift, thereby causing the magnetic head 50 to lift from the horizontal surface of the hard disk 20. Since the hard disk 20 is rotating when information is recorded in the record area 22 of the hard disk 20 or information is read therefrom, the magnetic head 50 is in a non-contact state separated a predetermined distance from the horizontal surface of the hard disk 20. Therefore, scratches due to friction between the magnetic head 50 and the record area 22 are not generated. But, when the rotation of the hard disk 20 is completely stopped, for example, when power is turned off, since the lift lifting the magnetic head 50 disappears, the actuator 30 pivots so that the magnetic head 50 can be positioned in the parking area 21 before the lift disappears.

In the above conventional latch apparatus, however, since the actuator 30 is locked by a (force of magnetically) magnetic coupling between the steel piece 61 and the magnetic member 43. When a impact greater than the magnetic force is applied in the locking state, the locking is released. In contrast, to release and pivot the locked actuator 30, the electromagnetic force generated by the moving coil 35 and the magnet 41 must exceed the coupling force between the steel piece 61 and the magnetic member 43. Thus the coupling force cannot be too great, because it would maintain the actuator 30 in a locked state and keep it from pivoting. In other words, when the magnetic coupling force between the steel piece 61 and the magnetic member 43 is too small, the locking is easily released by a small external impact, and when the magnetic coupling force is too great, the locking is not released and the actuator 30 is prevented from pivoting.

Further, in the above structure, when the locking is released by overcoming the magnetic coupling force, since the actuator 30 rapidly springs off at a high speed because of inertia, the coupling protrusion 36 may strongly collide against a stopper 42 provided at the opposite direction of the magnetic member 43. Collision between the actuator 30 and the stopper 42 may generate a head slap. To restrict the head slap, applying current to the moving coil 35 is controlled so that a braking force is applied to the actuator 30 at the same time it is unlocked. But it is difficult to configure a control system since accurate control of the timing is difficult. Also, since a repetitive stress is applied to the damper 60 by the repeated actions of locking and unlocking, the damper 60 may be damaged.

SUMMARY OF THE INVENTION

To solve the above-described problems, it is an aspect of the present invention to provide an actuator latch apparatus of a hard disk drive in which a locking state of an actuator is stably maintained while locking and unlocking actions are smoothly performed.

Additional aspects and advantages of the invention will be set forth in part in the description which follows and, in part, will be obvious from the description, or may be learned by practice of the invention.

There is provided an actuator latch apparatus of a hard disk drive for locking an actuator installed on a base and preventing it from pivoting. The actuator latch apparatus has a locking protrusion provided at one side of the actuator, a latch lever pivotably installed on the base and elastically biased such that a hook portion provided at one side of the latch lever restricts the locking protrusion, and an air flow pipe provided at the base and generating a driving torque to the latch lever by a difference in pressure between the atmosphere and air flowing along an air channel formed in the air flow pipe.

In a further aspect of the present invention a slot that is a path through which the atmosphere passes is formed at a neck portion of the air flow pipe.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION

Figure 1:
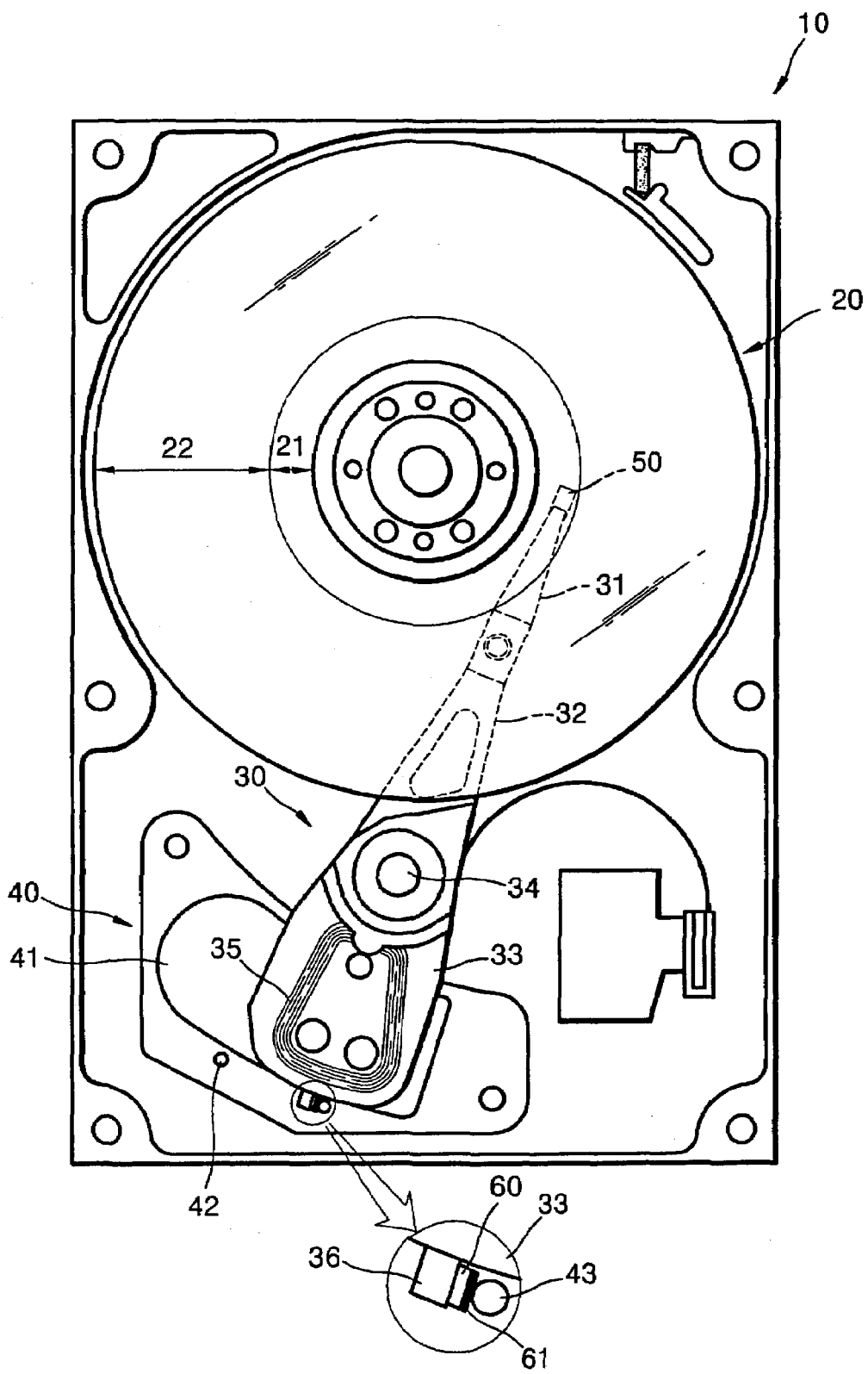
FIG. 1 is a plan view showing a hard disk drive having a conventional actuator latch apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
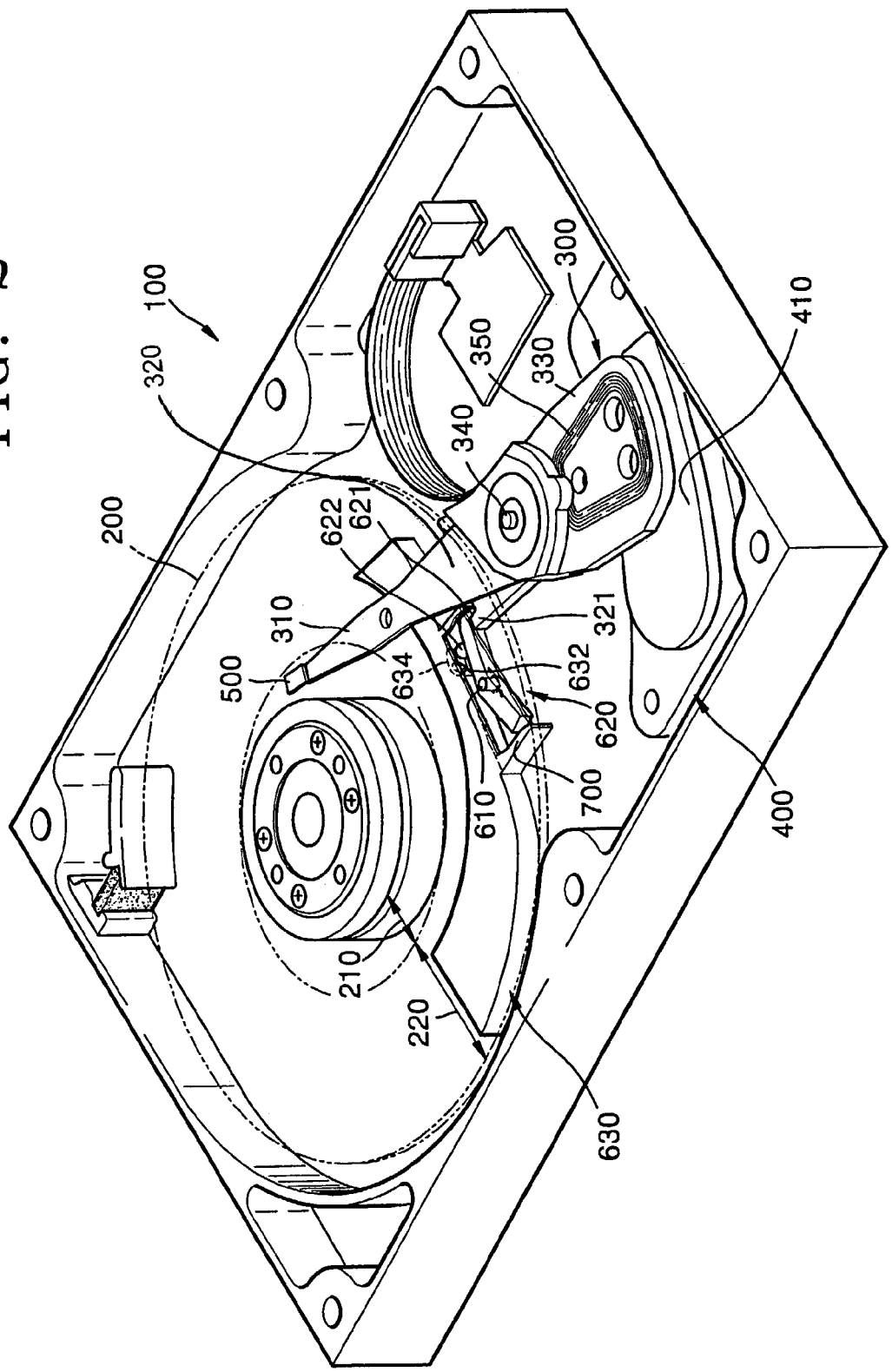
FIG. 2 is a perspective view illustrating a hard disk drive having an actuator latch apparatus according to a first embodiment of the present invention.

Referring to FIG. 2, a hard disk drive includes a hard disk 200 installed on a base 100 to be capable of rotating and a magnetic head transfer apparatus for transferring a magnetic head 500 for recording and reproducing information to and from a desired track position on the hard disk 200.

The magnetic head transfer apparatus includes an actuator 300 installed on the base 100 to be capable of pivoting and where the magnetic head 500 is installed at one side thereof, a voice coil motor (not shown) pivoting the actuator 300 to move the magnetic head 500 across a parking area 210 and a record area 220 formed on the hard disk 200, and a latch apparatus locking the actuator 300 after the magnetic head 500 is disposed in the parking area 210 of the hard disk 200.

The actuator 300 includes a suspension portion 310 supporting the magnetic head 500, an arm 320 rotatably coupled to a pivot shaft 340 provided at the base 100, and a bobbin portion 330 around which a moving coil 350 of the voice coil motor is wound. The voice coil motor includes the moving coil 350 and a magnet 410 installed at a yoke 400 installed on the base 100 generating lines of a magnetic force. The yoke 400 and the magnet 410 are arranged in a pair at each of the upper and lower sides with respect to the actuator 300 to face each other. Thus, a magnetic field in a vertical direction is formed by the magnet 410 between the upper and lower yokes 400.

Figure 3:
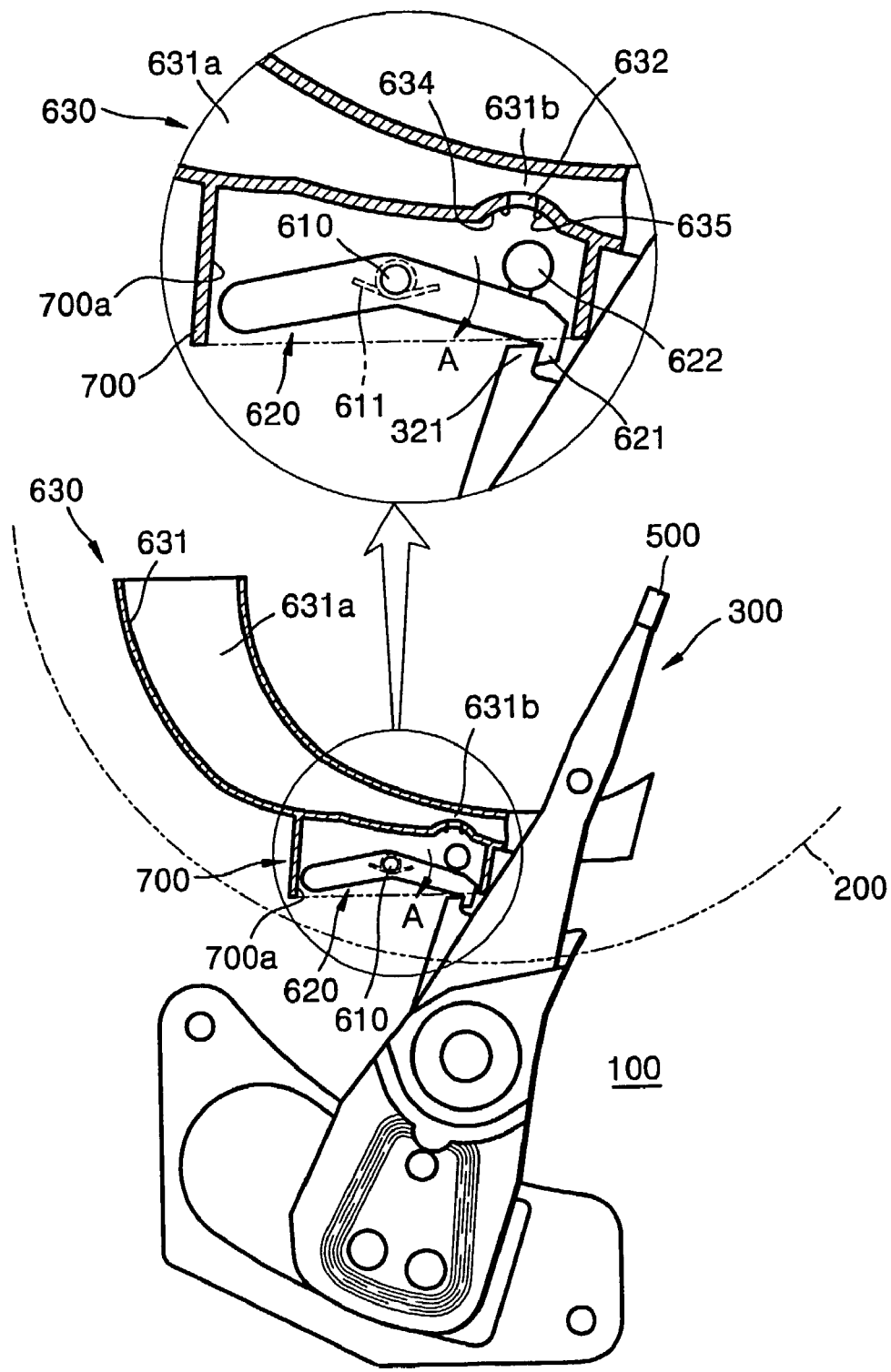
FIG. 3 is a plan view illustrating an actuator latch apparatus shown in FIG. 2.

The latch apparatus, as shown in FIG. 3, includes a locking protrusion 321 provided at one side of the actuator 300, a latch lever 620 installed to be capable of pivoting around a predetermined pivot shaft 610 provided on the base 100, and an air flow pipe 630 provided to have a shape of a venturi pipe and generating a driving torque to the latch lever 620 by a difference in pressure between the atmosphere and the air flowing along an air channel 631 formed therein. Here, a flow path having a sufficient length should be formed at an inlet portion 631a of the air flow pipe 630 so that air flowing along the air channel 631 becomes a fully developed flow.

The latch lever 620 is elastically biased so that a hook portion 621 provided at one side of the latch lever 620 hooks the locking protrusion 321 when the actuator 300 is rotated and the magnetic head 500 is disposed in the parking area 210 (refer to FIG. 2).

Also, a slot 632 that is a path through which the atmosphere is sucked in due to a difference in pressure between the atmosphere and the air flowing along the air channel 631 formed in the air flow pipe 630, is formed at a neck portion 631b which is the minimum sectional portion of the air flow pipe 630. Here, the opposite side to the side of the latch lever 620 where the hook portion 621 is provided is bent in a direction opposite to the air flow pipe 630 so that the latch lever 620 does not prevent the flow of the atmosphere sucked in through the slot 632.

Further, an accommodation surface 634 restricting a range of pivot as the latch lever 620 contacts the accommodation surface 634 when the hard disk 200 is rotated, is formed at the air flow pipe 630. The latch lever 620 has an accommodation protrusion 622 connected to one side of the latch lever 620 and being disposed on the accommodation surface 634 when the hard disk 200 is rotated. Here, the accommodation protrusion 622, as shown in FIG. 3, may be formed to be convex to have a ball shape or a hemispheric shape. The accommodation surface 634 may be formed to be concave to have a hemispheric shape which is complementary to the accommodation protrusion 622. Also, to not prevent the flow of the atmosphere sucked in through the slot 632, a plurality of separation protrusions 635 supporting the accommodation protrusion 622 disposed on the accommodation surface 634 to be separated from each other are preferably formed on the accommodation surface 634.

Furthermore, to guide the atmosphere to be sucked in through the slot 632 as much as possible, the actuator latch apparatus of a hard disk drive may further include a latch housing 700 installed on the base 100 such that the latch lever 620 is disposed therein and forming an air guide path 700a for guiding the atmosphere toward the slot 632. Here, the latch housing 700 extends from the air flow pipe 630 and can be formed integrally with the air flow pipe 630. Also, for the efficient use of space, the latch housing 700 can be installed at the same height as the air flow pipe 630 from the base 100.

The operation of the actuator latch apparatus according to a first preferred embodiment of the present invention having the above structure will now be described in detailed with reference to FIGS. 2 through 4.

First, referring to FIG. 3, when the hard disk 200 stops rotating, for example, when power is turned off, and the magnetic head 500 of the actuator 300 is disposed in the parking area 210 (refer to FIG. 2), the actuator 300 is locked in the following operations.

The latch lever 620 is installed on the base 100 to be capable of pivoting around the pivot shaft 610 and elastically biased by a torsion spring 611 in a direction as indicated by an arrow A. Thus, when the hard disk 200 is stopped, the hook portion 621 is coupled to the locking protrusion 321 provided at one side of the actuator 300 by an elastic force so that the latch lever 620 restricts the actuator 300 from pivoting.

Next, when the hard disk 200 is used again, the actuator 300 is unlocked in the following steps.

Figure 4:
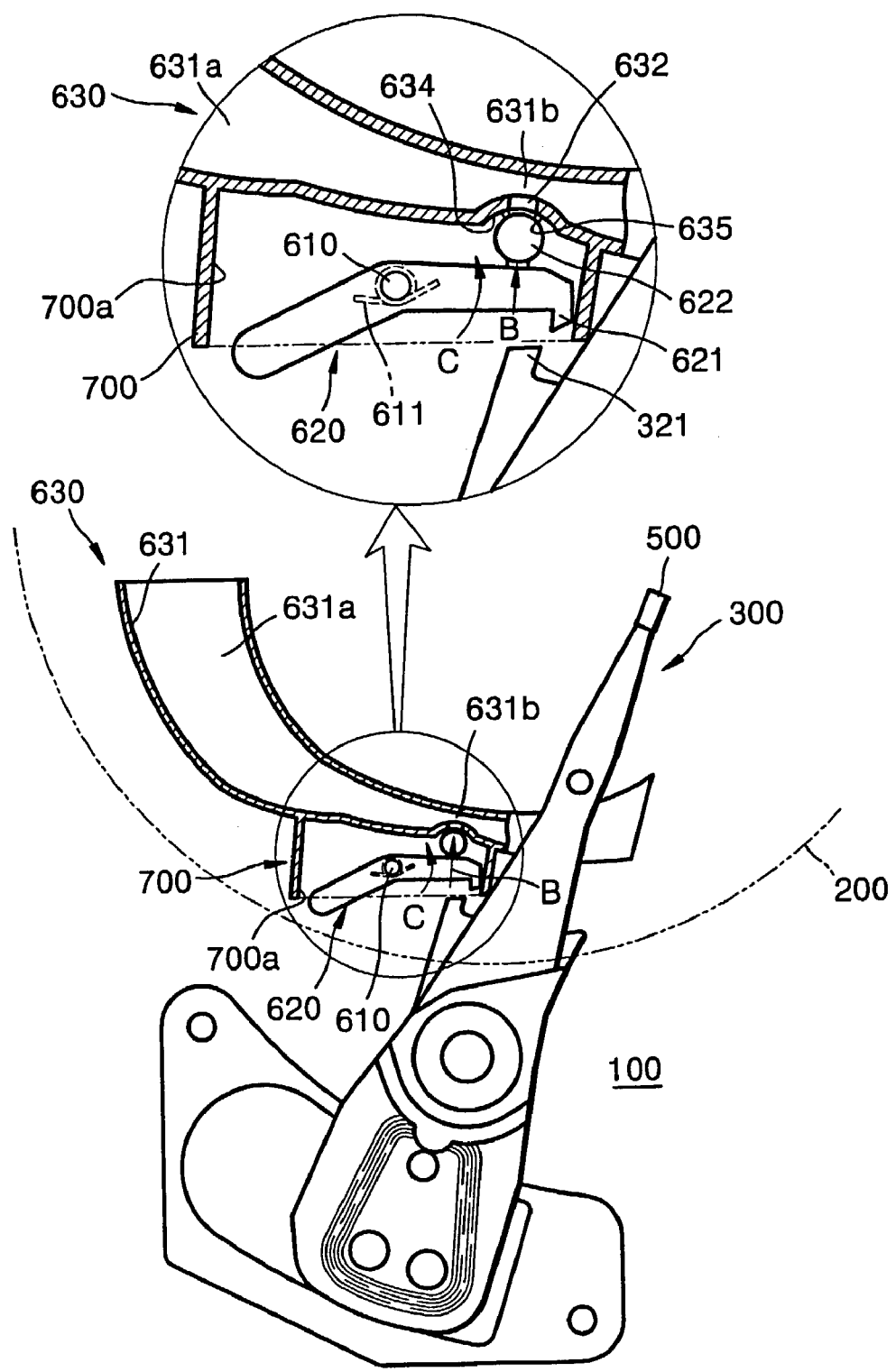
FIG. 4 is a plan view illustrating an unlocking state of the actuator latch apparatus shown in FIG. 2.

As shown in FIG. 4, when the hard disk 200 starts to rotate, a flow of air is generated on the upper and lower surfaces of the hard disk 200 by the rotation. The flow of air comes in the inlet portion 631a of the air channel 631 formed in the air flow pipe 630 installed at the base 100 and is developed sufficiently. However, since the air channel 631 has a shape of a venturi pipe having a sectional area decreasing from the inlet portion 631a to the neck portion 631b, the air pressure at the inlet portion 631a is high due to the compression of incoming air while the air pressure gradually decreases according to the Bernoulli's theorem as the air flows along the air channel 631 toward a portion having a smaller sectional area. The air pressure at the neck portion 631b becomes minimum. Thus, since the air pressure P1 at the neck portion 631b where the slot 632 is provided is lower than the pressure Patm of the atmosphere, air flows into the air channel 631 through the slot 632. The relationship in the amount between pressure P1 of the air flowing through the neck portion 631b of the air channel 631 and the pressure Patm of the atmosphere can be expressed as an inequity, Patm>P1.

Thus, since the atmosphere whose pressure is higher than the inner air of the air channel 631 flows in the air channel 631 through the slot 632, a force in a direction B is applied to the latch lever 620. A driving torque in a direction C is generated to the latch lever 620 by the force in the direction B with respect to the pivot shaft 610. When the driving torque exceeds the elastic force of the torsion spring 611 so that the latch lever 620 pivots in the direction C, the hook portion 621 of the latch lever 620 is released from the locking protrusion 321 of the actuator 300 so that the actuator 300 is unlocked. When the latch lever 620 pivots in the direction C, the accommodation protrusion 622 contacts the accommodation surface 634 formed in the air flow pipe 630 so as to restrict the rotation of the latch lever 620.

Next, when the hard disk 200 stops rotation, as shown in FIG. 3, since the flow of air is not generated and therefore there is no difference in pressure between the atmosphere and the air in the air channel 631, the latch lever 620 pivots in the direction A by the elastic force of the torsion spring 611 so that the actuator 300 is restricted again.

In the actuator latch apparatus according to an embodiment of the present invention, since the locking and unlocking operations are performed as the hook portion 621 of the latch lever 620 moves to a position for restricting or releasing the locking protrusion 321 of the actuator 300, the operation is smoothly performed compared to the conventional latch apparatus by a magnetic coupling. That is, a complicated control of applying a braking force at the same time of unlocking a magnetic coupling between the steel piece 61 of FIG. 1 and the magnetic member of FIG. 1, which is needed in the conventional latch apparatus, is no longer needed in the present invention. Also, since the actuator 300 does not move at all after being locked unless the latch lever 620 is rotated to the unlocking position, a firm locking state can be maintained.

As described above, in the actuator latch apparatus of a hard disk drive according to the present invention, since locking and unlocking are performed by selectively restricting the locking protrusion provided at the actuator, unlocking can be smoothly performed without any impacts while a locking state is maintained firmly. Also, since the latch lever is driven by the rotation of the hard disk, an additional supply of current that is needed in the conventional magnetic type latch apparatus is not needed, and thereby, consumption of current can be reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator latch apparatus of a hard disk drive for selectively preventing an actuator installed on a base from pivoting, the actuator latch apparatus comprising:
   a locking protrusion provided at one side of the actuator;
   a latch lever pivotably installed on the base and elastically biased such that a hook portion provided at one side of the latch lever restricts the locking protrusion; and
   an air flow pipe provided at the base and generating a driving torque to the latch lever by a difference in pressure between the atmosphere and air flowing along an air channel formed in the air flow pipe, wherein a slot that is a path through which the atmosphere passes is formed at a neck portion of the air flow pipe.

2. The actuator latch apparatus of claim 1, further comprising:
   an accommodation surface, limiting a range of pivot of the latch lever, and positioned at the air flow pipe by extending from the slot; and
   the latch lever comprises an accommodation protrusion extending from one side of the latch lever that is disposed on the accommodation surface when the hard disk rotates.

3. The actuator latch apparatus of claim 2, wherein:
   the accommodation protrusion is convex and has one of a ball shape and a hemispheric shape; and
   the accommodation surface is concave and has a hemispheric shape.

4. The actuator latch apparatus of claim 3, further comprising:
   a plurality of separation protrusions on the accommodation surface, supporting the accommodation protrusion when the accommodation protrusion is disposed on the accommodation surface.

5. The actuator latch apparatus of claim 1, further comprising:
   a latch housing installed on the base so that the latch lever is disposed in the latch housing and forming an air guide path guiding the atmosphere to the slot.

6. The actuator latch apparatus of claim 5, wherein:
   the latch housing is integrally formed with the air flow pipe by extending from the air flow pipe.

7. The actuator latch apparatus of claim 5, wherein:
   the latch housing is installed on the base at the same height as the air flow pipe.

8. The actuator latch apparatus of claim 5, wherein:
   the latch lever is formed so as not to interfere with the air guide path.

9. The actuator latch apparatus of claim 8, wherein:
   the side of the latch lever opposite the side on where the hook portion is provided is bent in a direction opposite to the air flow pipe.

10. An actuator latch apparatus of a hard disk drive for selectively preventing an actuator installed on a base from pivoting, the actuator latch apparatus comprising:
    a latch lever that:
      engages the actuator in a first latch lever position;

is induced to move from the first latch lever position to a second latch lever position by a fluid pressure differential induced by a channeled airflow;

is positioned outside the channeled airflow; and returns to the first latch lever position in the absence of the fluid pressure differential.

11. The actuator latch apparatus of claim 10, wherein:
the latch lever is elastically biased to the first latch lever position.

12. The actuator latch apparatus of claim 10, wherein:
the actuator returns to a parked position in the absence of the fluid pressure differential; and
the latch lever engages the actuator when the actuator is in the parked position and the latch lever is in the first latch lever position.

13. The actuator latch apparatus of claim 12, wherein:
the actuator is elastically biased to the parked position.

14. An actuator latch apparatus of a hard disk drive having a hard disk, for selectively locking and unlocking an actuator, comprising:
   a member on which a force is induced in response to rotation of the hard disk, the induced force unlocking the actuator; and
   a channel having a decreasing cross sectional area, and also having a slot, the channel directing air flow generated by rotation of the hard disk, and inducing a pressure differential at the slot that induces the force on the member.

15. A hard disk drive having a hard disk and an actuator, wherein the actuator has a locking protrusion, is pivotably installed on a base, and is elastically biased to a parked position, comprising:
   an actuator latch with a hook portion wherein:
      the actuator latch is elastically biased to a latch locked position,
      the hook portion of the actuator latch engages the locking protrusion when the actuator latch is in the latch locked position and the actuator is in the parked position, and
      a force is induced on the actuator latch in response to rotation of the hard disk and the induced force unlocks the actuator; and
   a channel that:
      has a decreasing cross sectional area,
      directs air flow generated by rotation of the hard disk,
      has a slot, and
      induces a pressure differential at the slot that induces the force on the actuator latch.

16. A hard disk drive having a hard disk, an actuator, a first member, a latch lever, and a second member, wherein:
   when no power is supplied to the hard disk drive:
      the first member biases the actuator to a parking zone;
      the second member biases the latch lever to a locked position that engages the actuator; and
   when power is supplied to the hard disk drive:
      a force generated by a directed fluid flow is induced on the latch lever, which is positioned outside the directed fluid flow, to overcome the latch lever bias and disengage the actuator.

17. A hard disk drive having a hard disk and an actuator, the hard disk drive comprising:
   a fluid channel channeling a fluid flow generated by rotation of the hard disk; and
   a latch lever, positioned outside of the channeled fluid flow, biased toward an actuator locking position, and induced, by a pressure differential across a slot in the fluid channel, to move from the actuator locking position by a force generated by the channeled fluid flow.

18. An actuator latch apparatus of a hard disk drive for selectively preventing an actuator installed on a base from pivoting, the actuator latch apparatus comprising:
   a fluid channel channeling a first fluid flow generated by rotation of a hard disk; and
   a latch lever, biased toward an actuator locking position, and induced to move from the actuator locking position by a second fluid flow admitted to the first fluid flow creating a pressure differential across a slot in the fluid channel.

* * * * *